United States Patent
Fukumura et al.

(10) Patent No.: US 6,334,503 B1
(45) Date of Patent: Jan. 1, 2002

(54) ELECTRICALLY OPERATED POWER STEERING APPARATUS SELECTIVELY RESTRICTING ELECTRIC POWER SUPPLY TO MOTOR BY USING INITIAL VALUE AND SUBSEQUENT INCREASE OF TEMPERATURE OF HEATED PORTION THEREIN

(75) Inventors: Kenichi Fukumura, Aichi-ken; Hajime Kamimae, Okazaki, both of (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/586,792

(22) Filed: Jun. 5, 2000

(30) Foreign Application Priority Data

Jun. 3, 1999 (JP) ............................................ 11-156675

(51) Int. Cl.$^7$ ................................................ B62D 5/04
(52) U.S. Cl. ........................ 180/446; 180/443; 318/434
(58) Field of Search ................................. 180/443, 446; 701/41, 42; 388/934; 318/434, 798, 802, 806, 471

(56) References Cited

U.S. PATENT DOCUMENTS 5,810,111 A * 9/1998 Takeuchi et al. ............. 180/443
5,889,378 A * 3/1999 Hayashi ....................... 318/541
5,925,995 A * 7/1999 Yoshida et al. .............. 318/434
6,141,494 A * 10/2000 Nishino et al. .............. 388/811
6,166,502 A * 12/2000 Pattok et al. ................ 318/434
6,268,708 B1 * 7/2001 Kawada et al. .............. 318/430

FOREIGN PATENT DOCUMENTS

JP          10-67335          3/1998
JP         10-100913          4/1998

* cited by examiner

Primary Examiner—Daniel G. DePumpo
(74) Attorney, Agent, or Firm—Oblon, Spivak, McClelland, Maier & Neustadt, P.C.

(57) ABSTRACT

An electrically operated power steering apparatus for an automotive vehicle having a steering wheel to be operated by the vehicle operator includes a motor and a power supply restricting device. The motor applies a drive force thereof to a torque transmitting system so as to assist a steering torque applied to the steering wheel by the vehicle operator. The power supply restricting device utilizes a temperature of a heated portion of the electrically operated power steering apparatus which emits heat as a result of a supply of an electric power to the motor, at a reference point of time, as an initial temperature of the heated portion, utilizes a plurality of electric power-related values each of which is related to at least one of a current and a voltage value of the motor, as a plurality of physical quantities related to temperature increases of the heated portion each of which is an increase of the temperature of the heated portion from that at the reference point of time, and restricts the electric power supply to the motor such that an actual value of the temperature of the heated portion does not exceed a predetermined upper limit thereof.

16 Claims, 10 Drawing Sheets

ELECTRICALLY OPERATED POWER STEERING APPARATUS SELECTIVELY RESTRICTING ELECTRIC POWER SUPPLY TO MOTOR BY USING INITIAL VALUE AND SUBSEQUENT INCREASE OF TEMPERATURE OF HEATED PORTION THEREIN

This application is based on Japanese Patent Application No. 11-156675 filed Jun. 3, 1999.

BACKGROUND OF THE INVENTION

1. Field of the Invention

The present invention relates to an electrically operated power steering apparatus in which a drive force of a motor assists a required value of steering torque applied to a steering wheel operated by an operator of an automotive vehicle.

2. Discussion of the Related Art

An electrically operated power steering apparatus for an automotive vehicle is generally constructed to include (a) a torque transmitting system transmitting steering torque which is applied to a steering wheel by a vehicle operator, to a steerable wheel of the vehicle laying on a road surface, so as to assist the steering torque, (b) a motor applying a drive force thereof to the torque transmitting system, and (c) a controlling device controlling an electric power supply to the motor.

Japanese Patent Publication No. 10-100913 discloses an example of a conventional type of the electrically operated power steering apparatus identified above. In this example, the temperature of a winding of a motor is estimated on the basis of a voltage and a current value of the motor, without the provision of a temperature sensor detecting a temperature of the motor. The estimated temperature results in preventing overheat of the motor.

However, in general, what can be accurately estimated in relation to the temperature of a winding of a motor by the use of a voltage and a current value of the motor is an increase of temperature of the motor winding at each one of a plurality of discrete points of time after a reference point of time. The increase is calculated from the temperature of the heated portion obtained at the reference point of time. The increase is a relative value, not an absolute value of temperature of the motor winding. In addition, the example explained above is not designed to detect or estimate an absolute value of temperature of the motor winding at the reference point of time. Consequently, this example fails to obtain the temperature of the motor with an adequately high precision.

In the case where a temperature sensor is arranged sufficiently near a winding of a motor, the temperature of the motor can be sequentially detected at a high precision. However, in this case, since such a temperature senor is generally expensive, there arises a problem that the substantial increase in the cost of an electrically operated power steering apparatus is unavoidable.

In addition, a problem of generation of heat as a result of a supply of an electric power to a motor arises about the motor in an electrically operated power steering apparatus, but the same problem can also arise about other electrical parts of the apparatus.

BRIEF SUMMARY OF THE INVENTION

It is therefore an object of the present invention to provide an electrically operated power steering apparatus in which the temperature of a heated portion of the apparatus which emits heat as a result of a supply of electric power to a motor can be more precisely obtained in lower cost.

The object may be achieved according to any one of the following modes of this invention. Each of these modes of the invention is numbered like the appended claims, and depends from the other mode or modes, where appropriate. This type of explanation about the present invention is for better understanding of some ones of a plurality of technical features and a plurality of combinations thereof disclosed in this specification, and does not mean that the plurality of technical feature and the plurality of combinations in this specification are interpreted to encompass only the following modes of this invention:

(1) An electrically operated power steering apparatus for an automotive vehicle having a steering wheel to be operated by an operator of the vehicle and a steerable wheel thereof laying on a road surface, comprising:

a torque transmitting system transmitting a steering torque which is applied to the steering wheel by the operator, to the steerable wheels;

a motor applying a drive force thereof to the torque transmitting system so as to assist the steering torque;

a controlling device controlling an electric power supply to the motor, thereby permitting reduction in a required value of the steering torque with the assist of the drive force of the motor; and a power supply restricting device utilizing a temperature of a heated portion of the electrically operated power steering apparatus which emits heat as a result of the electric power supply to the motor, at a reference point of time, as an initial temperature of the heated portion, utilizing a plurality of electric power-related values each of which is related to at least one of a current and a voltage value of the motor, as a plurality of physical quantities related to temperature increases of the heated portion each of which is an increase of the temperature of the heated portion from that at the reference point of time, and restricting the electric power supply to the motor such that an actual value of the temperature of the heated portion does not exceed a predetermined upper limit thereof.

In general, the temperature of the heated portion, if not changed or gently changed, forms a constant relationship thereof with an ambient temperature of the heated portion. In addition, the ambient temperature of the heated portion can be detected without using a temperature sensor exclusively used for detection of the temperature of the heated portion. Accordingly, the temperature of the heated portion, if not changed or gently changed, can be easily detected or estimated.

The use of at least one of a current and a voltage value of the motor permits estimation of an increase of the temperature of the heated portion from that at a reference point of time. In addition, control of the motor is usually effected with feedback of at least one of a current and a voltage value of the motor. Therefore, a sensor detecting at least one of a current and a voltage value of the motor is usually provided with the electrically operated power steering apparatus. Consequently, in many cases, at least one of a current and a voltage value of the motor can be easily detected.

There exists a technology of using the temperature of the heated portion detected or estimated in the manner mentioned above, as an initial temperature of the heated portion. There also exists a technology of using at least one of a current and a voltage value of the motor as a physical quantity related to an increase of the temperature of the heated portion from that at a time when the initial temperature of the heated portion has been obtained. These two technologies can cooperate with each other to estimate the temperature of the heated portion at each one of a plurality of discrete points of time after the initial temperature of the heated portion has been obtained.

Based on the above findings, the apparatus according to this mode (1) utilizes the temperature of the heated portion at a reference point of time as an initial temperature of the heated portion, and utilizes at least one of a current and a voltage value of the motor as a physical quantity related to an increase of the temperature of the heated portion from that at the reference point of time. Further, the apparatus according to this mode (1) restricts an electric power supply to the motor so as to prevent an actual value of the temperature of the heated portion from exceeding a predetermined upper limit of the temperature of the heated portion.

Consequently, in the apparatus according to this mode (1), it is not indispensable to employ a temperature sensor which exclusively detects the temperature of the heated portion with a high precision and which is expensive. Therefore, a substantial increase in the cost of the apparatus resulting from the addition of a function of obtaining the temperature of the heated portion to an electrically operated power steering apparatus can be easily avoided.

Further, in the apparatus according to this mode (1), a determination as to whether the restriction on the electric power supply to the motor is necessary or not is performed using both of an initial value and a subsequent increase of the temperature of the heated portion from the initial value, both of which are reflected by the actual condition of the heated portion. As a result, the presence of an unnecessary restriction on the electric power supply at lower temperature of the heated portion can be easily avoided, and the absence of a necessary restriction on the electric power supply at higher temperature of the heated portion can also be easily avoided.

The apparatus according to this mode (1) may be adapted to include a temperature sensor capable of precisely detecting the temperature of the heated portion as long as the temperature is substantially in a stable condition thereof. The apparatus according to this mode (1) may be also adapted to include a temperature sensor capable of precisely detecting the temperature of the heated portion not only in a stable condition thereof but also in a transitional condition thereof.

In the apparatus according to this mode (1), the heated portion may be defined as the motor, a switching element connected to the motor and a power supply to the motor, at least one of a plurality of media for transferring current from the power supply to the motor, including such as a wire, a connector, etc., for example. The heated portion also may be defined as at least one of the plurality of media which is especially required to be prevented from being overheated.

In the apparatus according to this mode (1), the torque transmitting system is generally constructed to include (a) a steering shaft rotatable with the steering wheel, (b) an axially movable steering rod permitting the orientation of the steerable wheel to change, and (c) a coupling device operatively coupling the steering shaft and steering rod such that a rotary motion of the steering shaft is converted into a linear motion of the steering rod. In this arrangement, the motor is engaged to at least one of the steering shaft, steering rod and coupling device so as to apply to the at least one of these three elements a drive force of the motor for assisting the steering torque of the steering wheel applied by the vehicle operator.

In the apparatus according to this mode (1), the restriction on the electric power supply may be effected by reducing an actual and absolute value of current (i.e., electric current) of the motor to a certain value. The certain value is smaller than a nominal value of current of the motor available when the restriction on the electric power supply is unnecessary, but is not equal to zero. The restriction on the electric power supply also may be effected by reducing the actual and absolute value to zero.

(2) The apparatus according to the above mode (1), wherein the power supply restricting device comprises:

a temperature estimating means for repeating obtaining one of the plurality of electric power-related values after the reference point of time, for obtaining a sum of the plurality of electric power-related values which have been already obtained, each time a new one of the plurality of electric power-related values has been obtained, the obtained sum being defined as an integrated value of the already obtained plurality of electric power-related values, for estimating the temperature increase of the heated portion on the basis of the obtained integrated value, and for estimating the temperature of the heated portion at each one of a plurality of discrete points of time after the reference point of time, on the basis of the initial temperature and the estimated temperature increase of the heated portion; and a power supply restricting means for restricting the electric power supply to the motor such that the actual value of the temperature of the heated portion does not exceed the predetermined upper limit, on the basis of the estimated temperature of the heated portion.

In the apparatus according to this mode (2), an increase of the temperature of the heated portion is estimated on the basis of an integrated value of a plurality of electric power-related values. As a result, the temperature increase of the heated portion is estimated by the adequate consideration of a time-dependent change in the electric power-related value. Therefore, in the apparatus according to this mode (2), the precision in estimation of the temperature increase of the heated portion is improved, resulting in another improvement in estimation of the temperature of the heating portion.

(3) The apparatus according to the above mode (2), wherein the power supply restricting means comprises a restricting amount determining means for, when the estimated temperature of the heated portion has reached a reference temperature formulated to be lower than the predetermined upper limit, restricting the electric power supply to the motor, and for repeating determining a restricting amount by which the electric power supply to the motor is to be restricted, on the basis of the estimated temperature of the heated portion at a corresponding one of a plurality of discrete points of time.

In the apparatus according to this mode (3), a restricting amount by which the electric power supply is to be restricted is repeatedly determined after the commencement of restriction on the electric power supply to the motor, on the basis of the temperature of the heated portion estimated at a corresponding one of a plurality of discrete points of time. Therefore, it can surely be avoided that an actual temperature of the heated portion exceeds the predetermined upper limit thereof.

(4) The apparatus according to the above mode (1), wherein the power supply restricting device comprises:

an allowable supply time period determining means for utilizing an initiation point of time of a holding operation of the steering wheel during which the vehicle operator is holding the steering wheel substantially at one steering position thereof which is other than a neutral position thereof, and for determining a time period which is estimated to pass from the initiation point of time of the holding operation until the temperature of the heated portion has reached the reference temperature, on the basis of the initial temperature of the heated portion, a reference temperature of the heated portion at which the restriction on the electric power supply to the motor is to be initiated, and the electric power-related value obtained at the initiation point of time of the holding operation, the determined time period being defined as an allowable supply time period for the electric power supply to the motor; and a supply restricting means for starting restricting the electric power supply to the motor when the determined allowable time period has passed.

In a holding operation during which the vehicle operator holds the steering wheel at one steering angle thereof, a change in the magnitude of the electric power supply to the motor, i.e., the electric power-related value of the motor is not as large as in a steering operation during which the vehicle operator operates the steering wheel so as to increase a steering angle thereof. Accordingly, if the magnitude of the electric power-related value at an initiation of the holding operation can be recognized, an increase of the temperature of the heated portion at each one of a plurality of discrete points of time after the initiation of the holding operation can be represented as a function of time, during the holding operation.

Based on this finding, in the apparatus according to this mode (4), an allowable power supply time period for the motor is determined as a time period which is estimated to pass from an initiation of a holding operation until the temperature of the heated portion has reached a reference temperature, on the basis of the initial temperature of the heated portion, and the electric power-related value obtained at the initiation of the holding operation. Further, when the determined allowable time period has passed, the restriction on the electric power supply to the motor is initiated.

Therefore, the apparatus according to this mode (4) can easily prevent an actual value of the temperature of the heated portion from exceeding the predetermined upper limit without an indispensable performance of integration of the plurality of electric power-related values.

In the apparatus according to this mode (4), the term "a holding operation" may be defined as an operation during which the rate of change in a steering angle of the steering wheel or an amount of change in the steering angel per a certain time period is not larger than a reference value. The term "a holding operation" also may be defined as an operation during which the rate of change in the electric power-related value or an amount of change in the electric power-related value is not larger than a reference value.

(5) The apparatus according to the above mode (4), further comprising a second allowable time period determining means for, at a change point of time when a time-dependent change of the electric power-related value occurs, whose amount is not less than a predetermined reference value thereof, during the holding operation, estimating the temperature increase which is an increase of the temperature of the heated portion from that at the initiation point of time of the holding operation, on the basis of an integrated value of the plurality of electric power-related values obtained during a period from the initiation point of time of the holding operation to the change point of time, and for estimating a time period which is expected to pass from the change point of time until the temperature of the heated portion has reached the reference temperature, on the basis of a sum of the estimated temperature increase and the initial temperature of the heated portion, and the electric power-related value obtained at the change point of time, the estimated time period being defined as a second allowable supply time period for the electric power supply to the motor.

There exists a fact that the electric power-related value, i.e., a physical quantity related to the temperature of the heated portion can vary even during a holding operation of the steering wheel by the vehicle operator. There also exists a fact that the temperature of the heated portion when a time-dependent change in the electric power-related value can be estimated on the basis of an integrated value of a plurality of electric-power related values which have been obtained since the initiation of the holding operation, and the initial temperature of the heated portion. In light of these facts, the apparatus according to this mode (5) determines a time period which is estimated to pass from the occurrence of the time-dependent change until the temperature of the heated portion has reached a reference temperature as a second allowable supply time period for the motor.

Accordingly, the apparatus according to this mode (5) can prevent an actual value of the temperature of the heated portion from exceeding the predetermined upper limit thereof due to a time-dependent change in the electric-power-related value during a holding operation of the steering wheel by the vehicle operator.

(6) The apparatus according to the above mode (4) or (5), wherein the allowable time period determining means comprises:

a first means for determining an allowable increase of the temperature of the heated portion on the basis of a difference between the reference temperature and the initial temperature of the heated portion; and a second means for determining the allowable supply time period corresponding to both the electric power-related value obtained at the initiation point of time of the holding operation and the determined allowable increase of the heated portion, according to a predetermined relationship among the electric power-related value obtained at the initiation point of time of the holding operation, the allowable increase, and the allowable supply time period.

(7) The apparatus according to the above mode (6), wherein the second means comprises a means for determining the allowable supply time period such that the allowable supply time period decreases as the allowable increase decreases, and decreases as the electric power-related value at the initiation point of time of the holding operation increases.

(8) The apparatus according to any one of the above modes (1)–(7), wherein the power supply restricting device comprises an initial temperature determining means for determining an ambient temperature of the heated portion at the reference point of time, as the initial temperature of the heated portion.

(9) The apparatus according to any one of the above modes (1)–(8), further comprising a torque detecting device detecting the steering torque, the torque detecting device including a temperature sensor detecting a temperature of the torque detecting device, the power supply restricting device comprising an initial temperature obtaining means for obtaining the initial temperature of the heated portion on the basis of the temperature detected by the temperature sensor.

In the apparatus according to this mode (9), the same temperature sensor performs both detection of the temperature of the heated portion and acquisition of an initial temperature of the heated portion. Accordingly, the apparatus according to this mode (9) can eliminate the total number of temperature sensors installed in an automotive vehicle, compared with the case where detection of the temperature of the heated portion and acquisition of an initial temperature of the heated portion are separately performed by respective temperature sensors. As a result, the apparatus according to this mode (9) can reduce increase in the cost of the apparatus due to the addition of a function for obtaining the temperature of the heated portion.

(10) The apparatus according to the above mode (9), wherein the temperature sensor is located near the heated portion in the electrically operated power steering apparatus.

(11) The apparatus according to the above mode (9) of (10), wherein the temperature sensor detects the temperature of the torque detecting device as a temperature to be changed according to a substantially constant correlation thereof with an ambient temperature of the heated portion.

(12) The apparatus according to any one of the above modes (9)–(11), wherein the controlling device comprises a means for controlling the electric power supply to the motor on the basis of the steering torque detected by the torque detecting device.

(13) The apparatus according to the above mode (1), wherein the power supply restricting device comprises:

a first allowable supply time period determining means for using an initiation point of time of one continuous steering operation of the steering wheel by the vehicle operator, and for determining a time period which is expected to pass from the initiation point of one continuous steering operation until the temperature of the heated portion has reached a reference temperature at which the restriction on the electric power supply to the motor is to be initiated, on the basis of the initial temperature of the heated portion, a reference temperature formulated to be lower than the predetermined upper limit, and the electric power-related value obtained at the initiation point of time of one continuous steering operation, the determined time period being defined as a first allowable supply time period for the electric power supply to the motor; and a second allowable supply time period determining means for, at each one of a plurality of discrete points of time after the initiation point of time of one continuous steering operation, estimating the temperature increase which is an increase of the temperature of the heated portion from that at the initiation point of time of one continuous steering operation, on the basis of an integrated value of at least one of the plurality of electrical power-related values which has been obtained since the initiation point of time of one continuous steering operation, and for determining a time period which is expected to pass from each one of the plurality of discrete points of time until the temperature of the heated portion has reached the reference temperature, on the basis of a sum of the estimated temperature increase and the initial temperature of the heated portion, and the electric power-related value obtained at a corresponding one of the plurality of discrete points of time, the determined time period being defined as a second allowable supply time period for the electric power supply to the motor; and a supply restricting means for starting restricting the power supply to the motor when the first or second allowable supply time period determined by the first or second allowable supply time period determining means has passed.

The apparatus according to this mode (13) can prevent an actual value of the temperature of the heated portion from exceeding the predetermined upper limit, according to the principle corresponding to a principle which is employed in the apparatus according to the above mode (4).

The apparatus according to this mode (13) may be used, irrespective of whether one continuous steering operation set forth in this mode (13) is defined as the holding operation set forth in the above mode (4).

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
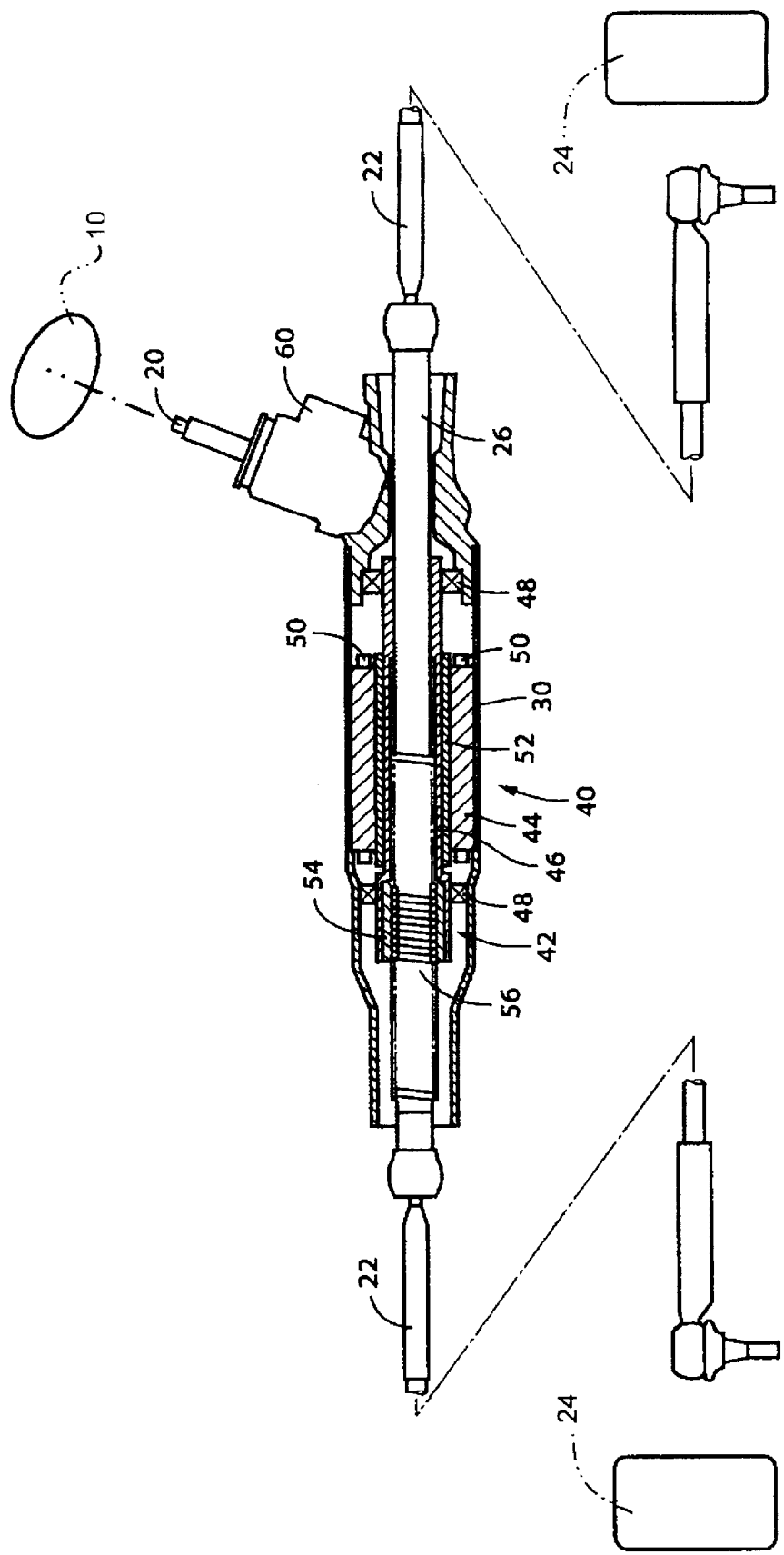
FIG. 1 is a cross sectional front view illustrating a mechanical arrangement of an electrically operated power steering apparatus constructed according to a first embodiment of this invention.

In the drawings, like numerals are used to indicate like elements throughout.

Referring first to FIG. 1, there will be described a mechanical arrangement of a first embodiment of the present invention in the form of an electrically operated power steering apparatus (hereinafter referred to simply as "a steering apparatus") for an automotive vehicle. The steering apparatus includes a steering shaft (not shown) rotatable with a steering wheel 10. The steering shaft is fixed at one of ends thereof which is remote from the steering wheel 10, to one end of a torsion bar 20.

The steering apparatus further includes a pair of tie rods 22, 22 pivotably connected to a pair of knuckle arms (not shown), respectively. The pair of knuckles are attached to a pair of steerable wheels 24, 24 (e.g., a front set of steerable wheels) of the vehicle, respectively. The pair of tie rods 22, 22 are connected to each other through a steering rod 26 extending in a lateral direction of the vehicle such that the pair of tie rods 22, 22 are bendable and rotatable relative to the steering rod 26.

The steering apparatus further includes a hollow main housing 30 fixedly mounted at a body of the vehicle. The main housing 30 is passed through by the steering rod 26 with a radial clearance therebetween so that the steering rod 26 is axially movable relative to the main housing 30.

The main housing 30 further accommodates a motor 40 and a motion converting mechanism in the form of a ball screw 42.

The motor 40 is constructed to include a stator 44 fixed to the main housing 30 and a cylindrical rotor 46 with the stator 44 and rotor 46 being rotatably fitted to each other. The rotor 46 is supported on the main housing 30 via a plurality of bearings 48 such that the rotor 46 is rotatable but is not axially movable relative to the main housing 30. A motor coil 50 is wound around the stator 44, and a cylindrical magnet 52 is fixed to the rotor 46 at its outer circumference. The rotor 46 is rotated as a result of interaction of an electromagnetic force of the motor coil 50 and a magnetic force of the magnet 52.

The ball screw 42 identified above is in the form of a combination of a nut 54 and a shaft 56 wherein the nut 54 and shaft 56 are rotatably fitted to each other via a plurality of balls. The nut 54 is coaxially fixed to the rotor 46, and the shaft 56 is integrally formed at the steering rod 26 described above. In the ball screw 42, a rotary motion of the nut 54 is converted into an axial motion of the shaft 56.

The steering apparatus further includes a gear box 60. As shown in the enlarged view of FIG. 2, the gear box 60 is equipped with (a) a gear box housing 62 fixedly mounted within the vehicle body, and (b) a pinion shaft 66 rotatably supported on the gear box housing 62 through a bearing 64. A pinion 68 is coaxially and integrally formed at the pinion shaft 66. The steering rod 26 forms a plane portion on its outer circumferential surface 26. The plane portion extends in parallel with the steering rod 26, forming a rack 70. The rack 70 meshes with the pinion 68 explained above, whereby the rack 70 is axially moved due to a rotation of the pinion 68. That is, they cooperate with each other to constitute a so-called rack and pinion mechanism. Consequently, the steering rod 26 is axially moved due to a rotary motion of the pinion 68 and a rotary motion of the motor 40. The pinion 68 is fixed to a remaining end of the torsion bar 20 described above so as to permit the pinion 68 to rotate with the steering wheel 10 mentioned above.

When the vehicle operator applies a steering torque to the steering wheel 10, the torsion bar 20 is then twisted accordingly. In addition, there is established a constant relationship between the magnitude of the steering torque and an angle of twist of the torsion bar 20. Consequently, the magnitude of the steering torque can be detected from the angle of twist of the torsion bar 20. In the present embodiment, for obtaining the angle of twist of the torsion bar 26, the torsion bar 26 extends through a rotatable member in the form of a sleeve 74. One of opposite ends of the sleeve 74 is fixed to one of opposite ends of the torsion bar 20 which is remote from the other end at which the torsion bar 20 is connected to the pinion shaft 66. The other end of the sleeve 74 is rotatably fitted with the pinion shaft 66. The sleeve 74 is rotatably supported at the gear box housing 82 described above via a bearing 76.

The gear box 60 is equipped with a torque detecting device 80 detecting the steering torque applied to the steering wheel 10 using the sleeve 74 described above. The torque detecting device 80 accommodates a first member 82 and a second member 84. The first member 82 is coaxially fixed to the sleeve 74 on its outer side so that the first member 82 rotates with the sleeve 74. On the other hand, the second member 84 is fixed to the pinion shaft 66 at a position at which the second member 84 is coaxially opposing to the pinion shaft 66 and which is close to the pinion shaft 66. The first member 82 has a plurality of teeth (not shown) forming one circular line on a first member end face which is one of opposite end faces of the first member 82 opposing to the second member 84. Similarly, the second member 84 has a plurality of teeth (not shown) forming one circular line on a second member end face which is one of opposite end faces of the second member 84 opposing to the first member 82. Consequently, depending upon a change in a relative angular position between the first and second member end face, an area (hereinafter referred to as "an overlapping area") of a portion where a tip of each tooth on the first member end face and a tip of each tooth on the second member end face overlap each other is changed.

The torque detecting device 80 explained above is farther equipped with a ring-shaped coil 90 for detecting a torque, coaxially with the first and second member 82, 84. The coil 90 is fixed to the gear box housing 62 described above on the outside of the first and second member 82, 84 at a position close to the first and second member end face mentioned above, via a small clearance. The coil 90 is surrounded by a member 91 for facilitating a magnetic path to be formed therein on the outside of the coil 90. When a magnetic flux is generated within the coil 90, the magnetic flux passes through the first and second member 82, 84 together, with a permeance of the magnetic flux being changed depending upon the overlapping area described above. This means that an inductance of the coil 90 is changed relying on the overlapping area. Eventually, the inductance of the coil 90 is changed depending upon the magnitude of the steering torque of the steering wheel 10.

Figure 2:
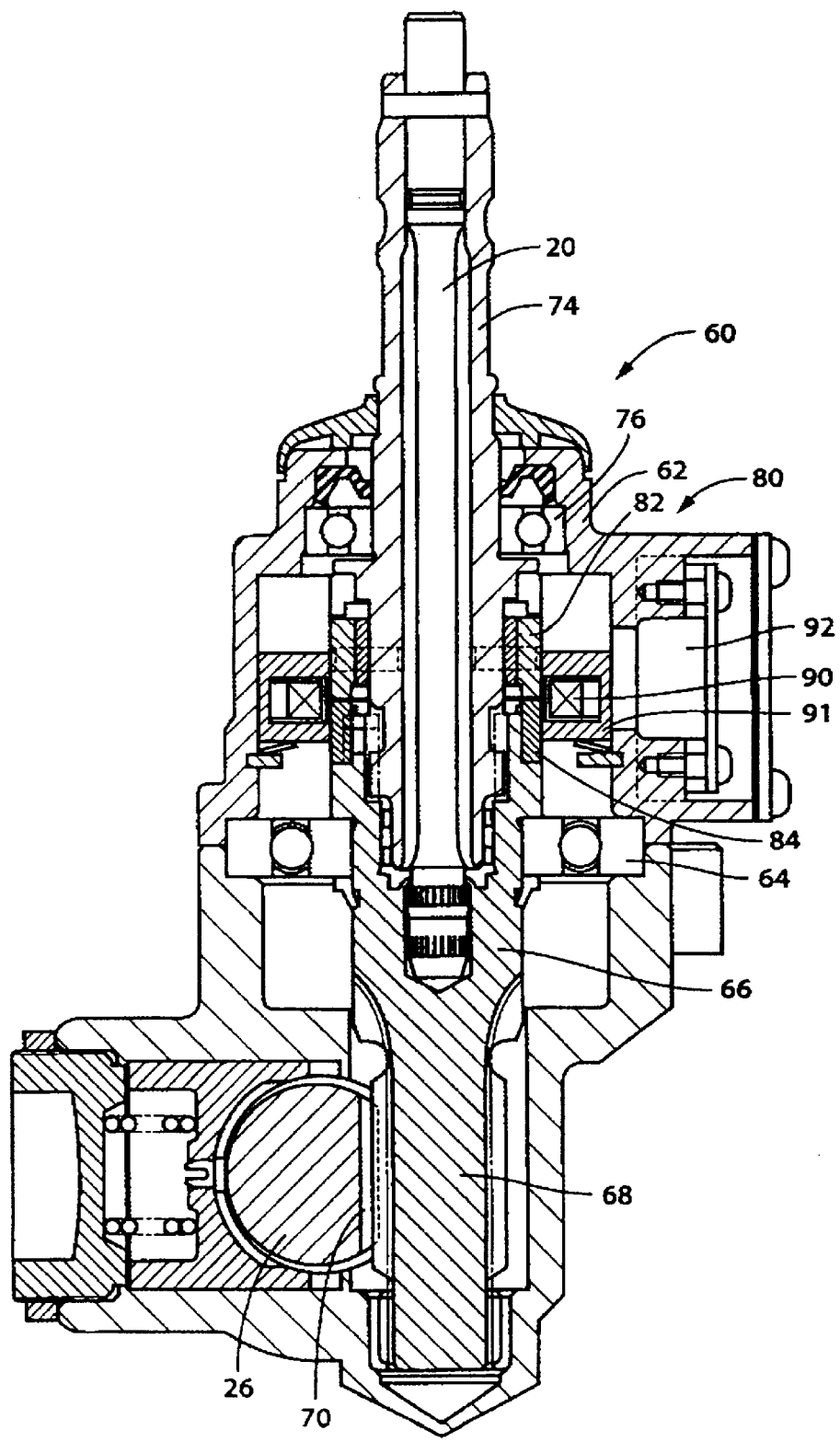
FIG. 2 is a cross sectional front view exclusively illustrating in enlargement a gear box 60 of FIG. 1.
Figure 3:
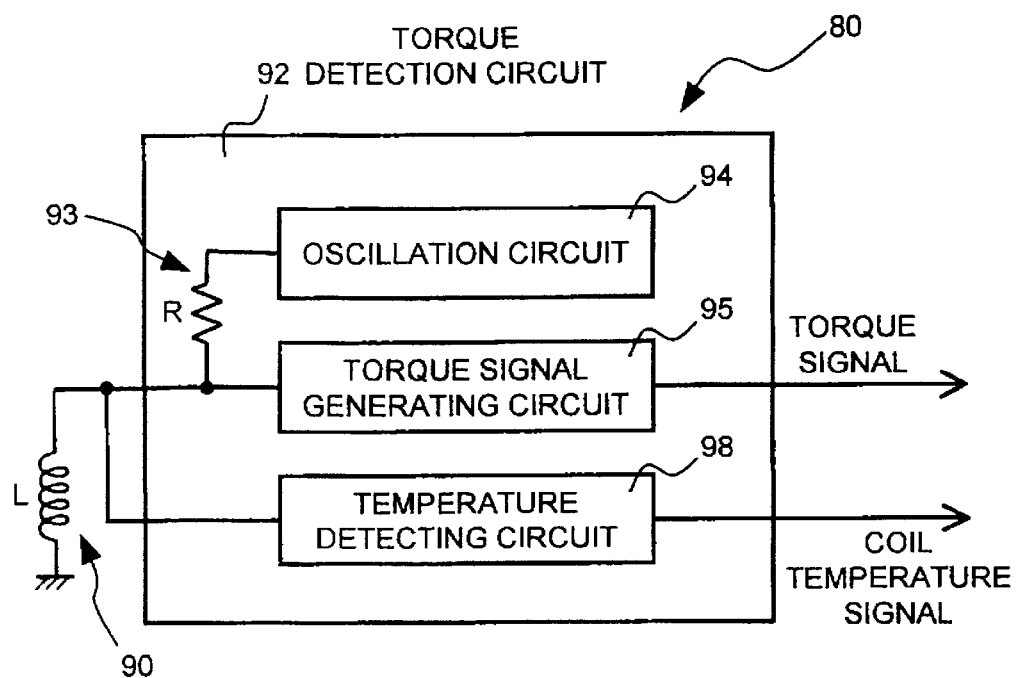
FIG. 3 is an electric circuit diagram illustrating a torque detecting device 80 equipped with the electrically operated power steering apparatus of FIG. 1.

The torque detecting device 80 further includes a torque detecting circuit 92 shown in FIG. 3. As shown in FIG. 2, the torque detecting device 80 is mounted at the main housing 62 described above. As shown in FIG. 3, the torque detecting circuit 92 is equipped with a resistor 93 connected to the coil 90 explained above in series therewith, and an oscillation circuit 94 connected to the resistor 93. The oscillation circuit 94 outputs a predetermined pulse signal to the coil 90 through the resistor 93. The torque detecting circuit 92 further includes a torque signal generating circuit 95. The torque signal generating circuit 95 receives a signal output from the coil 90 in response to the pulse signal from the oscillation circuit 94, and then generates a torque signal representing the inductance of the coil 94, that is, the steering torque of the steering wheel 10. Additionally, the torque signal generating circuit 95 outputs the generated torque signal to a motor controller 96 (See FIG. 4).

The torque detecting device 92 further includes a temperature detecting circuit 98 connected to the coil 90 explained above. The temperature detecting circuit 98 detects the temperature of the coil 90 on the basis of a resistance thereof, and outputs a coil temperature signal representing the detected temperature of the coil 90. The motor controller 96 calculates a provisional value of the steering torque on the basis of the received torque signal, and then corrects the previously calculated provisional value of the steering torque into a final value which does not depend on the temperature of the coil 90, on the basis of the received coil temperature signal.

It is added that, although temperature compensation is thus performed in order that a change in the finally detected steering torque due to change in the temperature of the coil 90 to be compensated, using a computer in a software manner in the present embodiment, the temperature compensation may be performed using an electrical circuit in a hardware manner by accepting an arrangement where an additional coil of the same type with the coil 90 is disposed close to the coil 90 as a coil for detecting the temperature of the coil 90, and a component of the torque signal output from the coil 90 depending upon the temperature thereof is cancelled by a coil temperature signal output from the additional coil.

Figure 4:
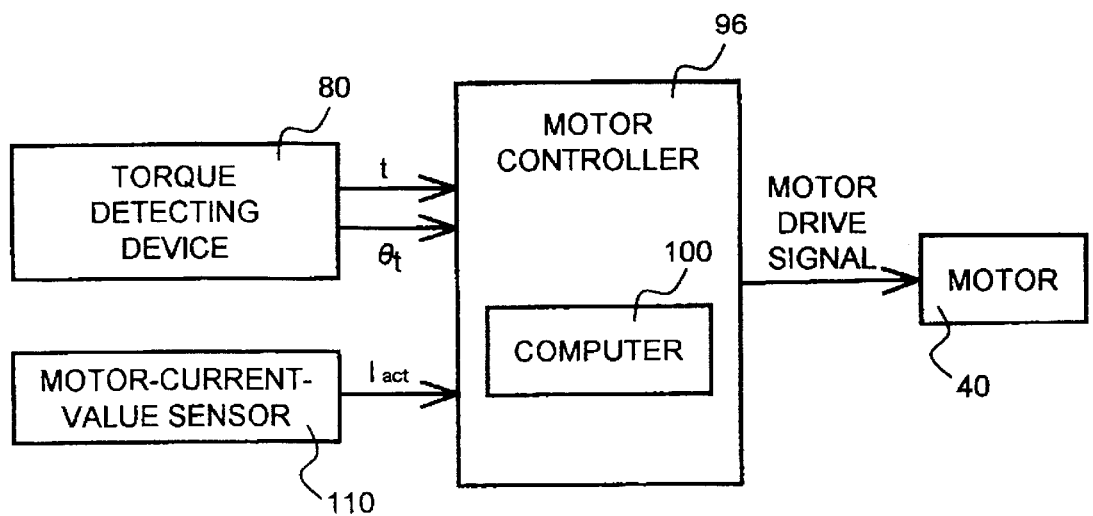
FIG. 4 is a block diagram illustrating a software arrangement of the electrically operated power steering apparatus of FIG. 1.

A software arrangement of the present steering apparatus is illustrated in FIG. 4. The steering apparatus includes the motor controller 96 mentioned above. The motor controller 96 is principally constructed by a computer incorporating a central processing unit (CPU), a read-only memory (ROM), and a random-access memory (RAM). To the input side of the motor controller 96, there are connected the torque detecting device 80 described above, and a motor-current-value sensor 110. The motor-current-value sensor 110 detects an actual current value flowing through the motor coil 50. To the output side of the motor controller 96, there is connected the motor coil 50 of the motor 40 as explained above.

The ROM explained above has stored various control programs. These programs include (a) a motor-temperature estimation routine executed to estimate the temperature (hereinafter referred to simply as "motor temperature") of the motor coil 50, (b) a reference motor-current value determination routine executed to determine a reference motor-current-value as being equal to a desired motor-current-value used in the case where restriction on an electric power supply to the motor 40 is unnecessary, (c) a desired motor-current-value determination routine executed to the desired motor-current-value so as to selectively restrict the electric power supply to the motor 40, and (d) a motor drive routine executed to supply a drive signal to the motor 40 for driving the motor 40. These routines will be described below in this descriptive sequence.

Figure 5:
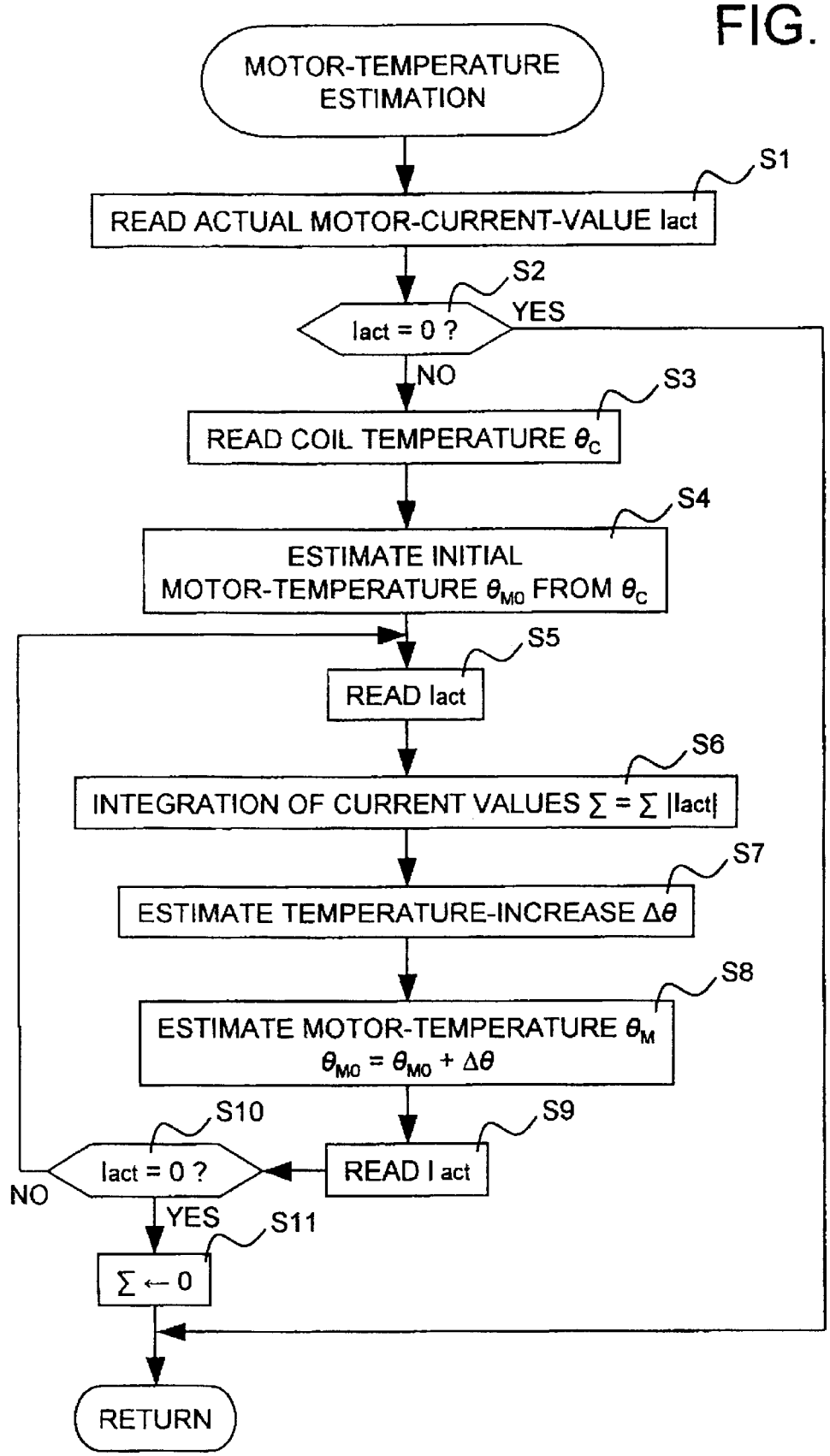
FIG. 5 is a flow chart illustrating a motor temperature estimation routine executed by a computer 100 of FIG. 4.

The motor-temperature estimation routine is illustrated in the flow chart of FIG. 5.

Described conceptually first, the present routine is formulated by especially taking account of a fact that there exists a constant correlation between the coil temperature $\theta_C$ detected by the temperature detecting circuit 98, and an initial motor-temperature $\theta_{M0}$ which is the temperature of the motor 40 at initiation of a driving operation of the motor 40 during one continuous steering operation of the steering wheel 10 by the vehicle operator. The present routine is executed to estimate the initial motor-temperature $\theta_{M0}$ from the coil temperature $\theta_C$. That is, in the present embodiment, the initiation of one continuous drive operation of the motor 40 corresponds to "a reference point of time." The present routine is further executed to sequentially detect an actual motor-current-value $I_{act}$ using the motor-current-value sensor 110 after the initiation of drive operation of the motor 40. The execution is to calculate an integrated value $\epsilon$ of a plurality of actual motor-current-values $I_{act}$, and to estimate a current motor-temperature $\theta_M$ on the basis of the calculated integrated value $\epsilon$. The estimation is performed using a constant correlation between the integrated value $\epsilon$ and the motor-temperature $\theta_M$.

Described in detail, this routine is cyclically executed by the computer 100. Each cycle of execution of this routine begins in step S1 to read the actual motor-current-value $I_{act}$ from the motor-current-value sensor 110. This routine proceeds to step S2 where a determination is made as to whether the actual motor-current-value $I_{act}$ is substantially equal to zero. That is, this step is implemented to determine whether it is at initiation of a drive operation of the motor 40. If the actual motor-current-value $I_{act}$ is substantially equal to zero, the determination is affirmative (YES), and then one cycle of execution of this routine is terminated.

Figure 6:
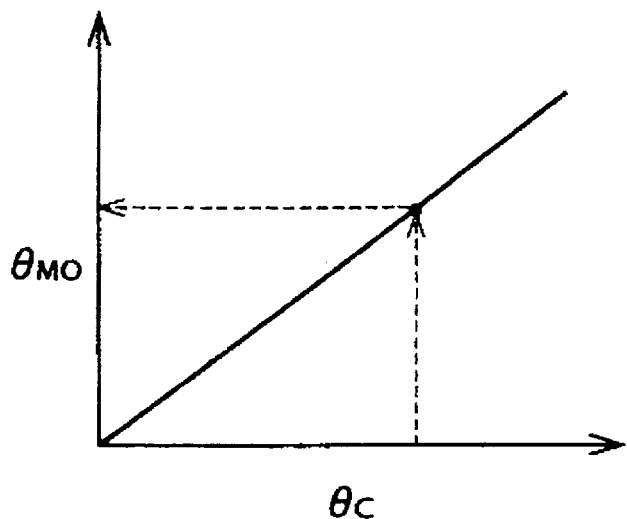
FIG. 6 is a graph representing a relationship between a coil temperature $\theta_C$ and an initial temperature $\theta_{M0}$ of the motor utilized in the motor temperature estimation routine of FIG. 5.

To the contrary, unless the actual motor-current-value $I_{act}$ is substantially equal to zero, the determination is negative (NO), and then this routine proceeds to S3 where the coil temperature $\theta_C$ is read out from the temperature detecting circuit 98. In step S4, the initial motor-temperature $\theta_{M0}$ is then estimated on the basis of the previously read coil temperature $\theta_C$. In the present embodiment, the ROM has stored a relationship as shown in the graph of FIG. 6 between the coil temperature $\theta_C$ and the initial motor-temperature $\theta_{M0}$, in the form of a table, a map, an expression, etc. According to the stored relationship, the initial motor-temperature $\theta_{M0}$ is estimated from the coil temperature $\theta_C$.

In the step S5 of FIG. 5, the actual motor-current-value $I_{act}$ is then read out from the motor-current-value sensor 110. In step S6, a present value of the integrated value $\epsilon$ is updated by adding an absolute value of the actual motor-current-value $I_{act}$ to the present value of the integrated value $\epsilon$. It is noted that the integrated value $\epsilon$ is designed to be initialized as zero when an electric power is first applied to the computer 100.

In step S7, estimation is preformed as to a motor-temperature increase $\Delta\theta$ which is an increase of the motor-temperature $\theta_M$ from that at the initiation of the drive operation of the motor 40, on the basis of the present value of the integrated value $\epsilon$. In the present embodiment, the ROM has stored a relationship between the integrated value $\epsilon$ and the motor-temperature increase $\Delta\theta$, in the form of a table, a map, an expression, etc. According to the stored relationship, the motor-temperature increase $\Delta\theta$ is estimated from the integrated value $\epsilon$.

In step S8, a present value of the motor-temperature $\theta_M$ is then estimated by adding the estimated motor-temperature increase $\Delta\theta$ to the estimated initial motor-temperature $\theta_{M0}$.

The estimated motor-temperature $\theta_M$ is stored in the RAM described above.

In step S9, the actual motor-current-values $I_{act}$ is then read out from the motor-current-value sensor 110. In step S10, a determination is then made as to whether a condition that the actual motor-current-values $I_{act}$ is substantially equal to zero has been consecutively repeated a predetermined number of times. This step is implemented to determine whether the drive operation of the motor 40 has been terminated or not. If the actual motor-current-values $I_{act}$ is not substantially equal to zero, the determination is negative, and then this routine proceeds back to step S5. If the condition above-mentioned has been consecutively repeated the predetermined number of times, as a result of repeated execution of a loop including steps S5–S10, the determination in step S10 is affirmative, and then this routine proceeds to step S11 where the present value of the integrated value $\epsilon$ is initialized as zero for subsequent execution of this routine. Then, one cycle of execution of this routine is terminated.

Figure 7:
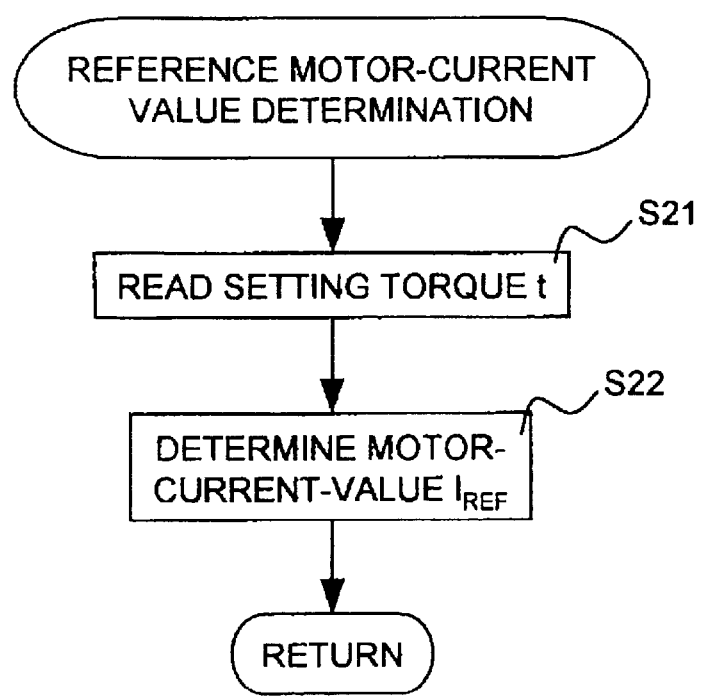
FIG. 7 is a flow chart illustrating a reference motor-current-value determination routine executed by the computer 100 of FIG. 4.

The reference motor-current-value determination routine is represented in the flow chart of FIG. 7. This routine is cyclically executed by the computer 100, like the motor-temperature estimation routine as previously described. In each cycle of execution of this routine, step S21 is initially implemented to read the steering torque t from the torque detecting device 80. This routine then proceeds to step S22 where the reference motor-current-value $I_{REF}$ is determined on the basis of the previously read steering torque t. The reference motor-current-value $I_{REF}$ is a current value which is allowed to be supplied to the motor coil 50 when the motor-temperature $\theta_M$ has not exceeded a predetermined upper limit temperature $\theta_{LIMIT}$. In the present embodiment, the ROM has stored a relationship between the steering torque t and the reference motor-current-value $I_{REF}$, in the form of a table, a map, an expression, etc. According to the stored relationship, the reference motor-current-value $I_{REF}$ is determined from the steering torque t. The determined reference motor-current-value $I_{REF}$ is stored in the RAM described above. Then, one cycle of execution of this routine is terminated.

The desired motor-current-value determination routine mentioned above is illustrated in the flow chart of FIG. 8. This routine is cyclically executed by the computer 100, like the other routines as already described. In each cycle of execution of this routine, step S41 is initially implemented to read a present value of the estimated motor-temperature $\theta_M$ from the RAM. This routine then proceeds to step S42 where a determination is made as to whether the estimated motor-temperature $\theta_M$ is not lower than a predetermined reference temperature $\theta_{REF}$ lower than the upper limit temperature $\theta_{LIMIT}$. If the estimated motor-temperature $\theta_M$ is lower than the predetermined reference temperature $\theta_{REF}$, the determination is negative, and then this routine proceeds to step S43. In this step, a present value of the reference motor-current-value $I_{REF}$ is read out from the RAM, and then the reference motor-current-value $I_{REF}$ as such is utilized as a present value of the desired motor-current-value I*. The desired motor-current-value I* is stored in the RAM. Then, one cycle of execution of this routine is terminated.

To the contrary, if the estimated motor-temperature $\theta_M$ is not lower than the predetermined reference temperature $\theta_{REF}$, the determination in step S42 is affirmative, and then this routine proceeds to step S44 where the restriction on the electric power supply to the motor 40 is effected. Described in more detail, a present value of the reference motor-current-value $I_{REF}$ is read out from the RAM, the reference motor-current-value $I_{REF}$ is then multiplied by a predetermined correction factor k larger than "0" and smaller than "1." The predetermined correction factor k is determined such that it decreases as a difference between the estimated motor-temperature $\theta_M$ at that time and the upper limit temperature $\theta_{LIMIT}$ decreases, whereby the motor-temperature $\theta_M$ is prevented from exceeding the upper limit temperature $\theta_{LIMIT}$ after initiation of the restriction on the electric power supply to the motor 40. A product of the reference motor-current-value $I_{REF}$ and the correction factor k is stored as a present value of the desired motor-current-value I* in the RAM. Then, one cycle of execution of this routine is terminated.

Figure 9:
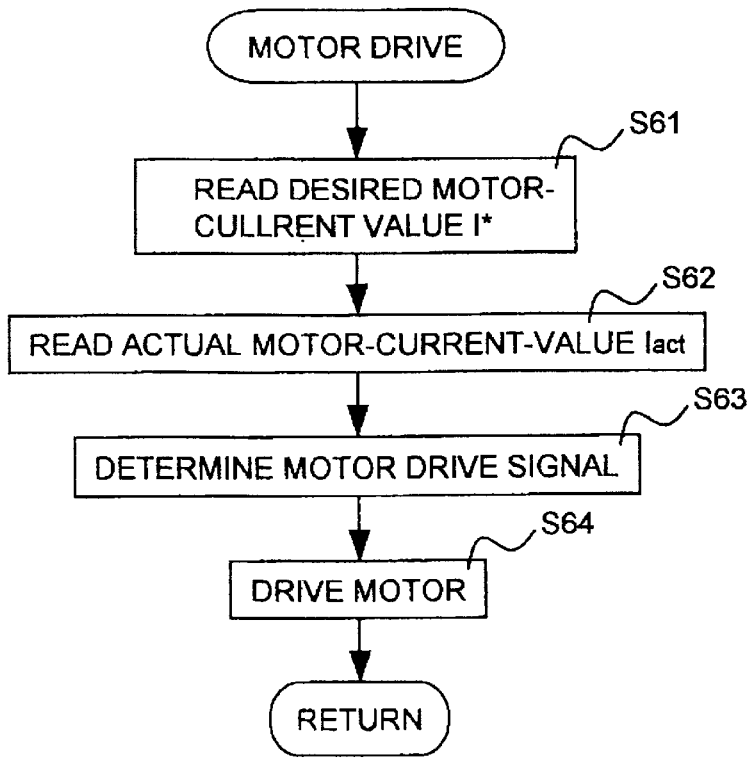
FIG. 9 is a flow chart illustrating a motor drive routine executed by the computer 100 of FIG. 4.

The motor drive routine is illustrated in the flow chart of FIG. 9. This routine is cyclically executed by the computer 100, like the other routines as already described. In each cycle of execution of this routine, step S61 is initially implemented to read a present value of the desired motor-current-value I* from the RAM. This routine then proceeds to step S62 to read the actual motor-current-value $I_{act}$ from the motor-current-value sensor 110. In the step S63, a motor drive signal suitable to be supplied to the motor coil 50 for substantial coincidence of the actual motor-current-value $I_{act}$ with the desire motor-current-value I* is determined by feedback of the actual motor-current-value $I_{act}$. In step S64, the determined motor drive signal is then supplied to the motor coil 50 thereby driving the motor 40. Then, one cycle of execution of this routine is terminated.

Figure 10A:
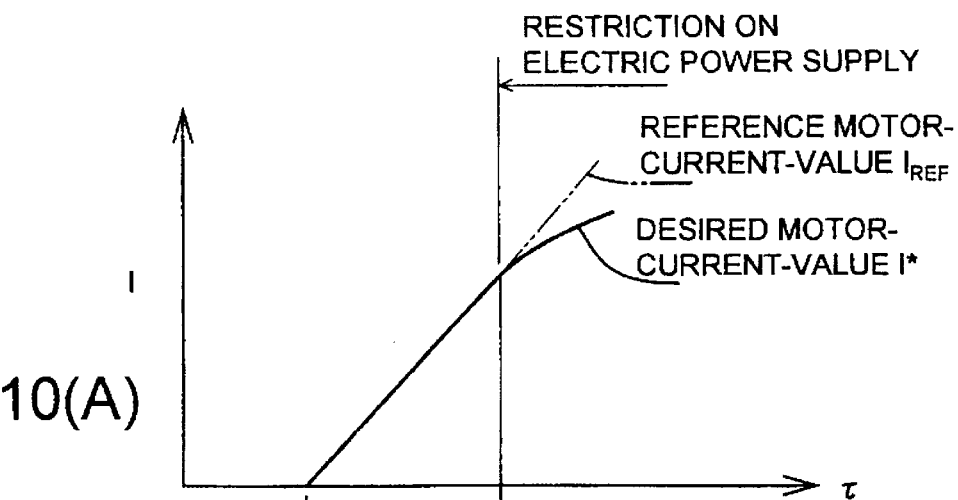
FIG. 10 is a graph for explaining changes with time τ in a motor-current-value I, a coil temperature $\theta_C$ and a motor temperature $\theta_M$ in the electrically operated power steering apparatus of FIG. 1.
Figure 10B:
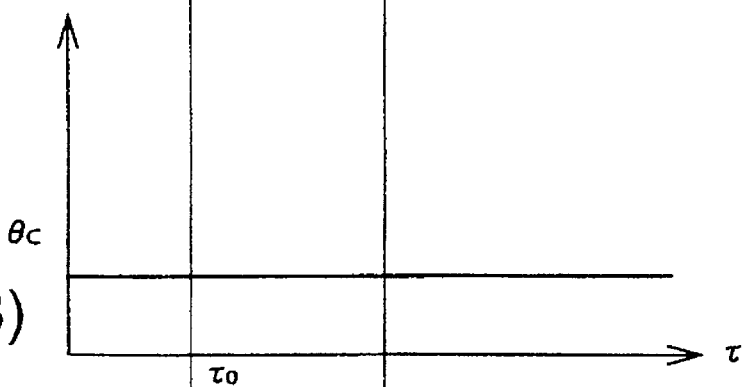
Figure 10C:
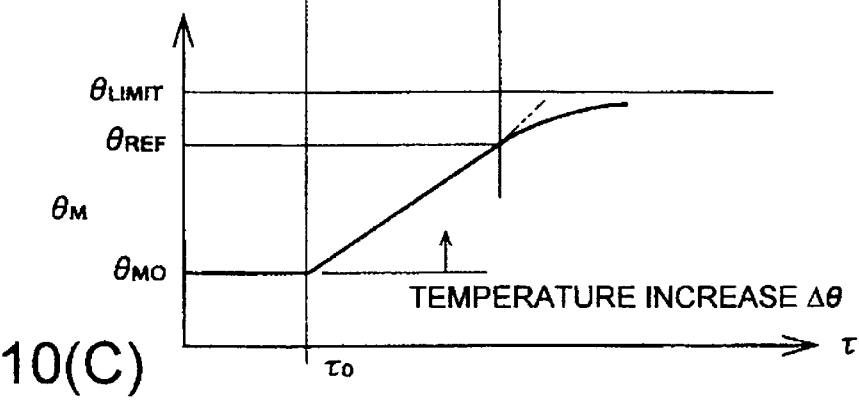

Changes with time $\tau$ in the reference motor-current-value $I_{REF}$, the desire motor-current-value I*, the coil-temperature $\theta_C$ (not by its actual value but by its detected value), and the motor-temperature $\theta_M$ are illustrated in the graph of FIG. 10. Referring to FIG. 10, when the motor-temperature $\theta_M$ is raised to the reference motor-current-value $I_{REF}$, the restriction on the electric power supply to the motor coil 50 is initiated, whereby the desire motor-current-value I* is reduced below the reference motor-current-value $I_{REF}$. Consequently, an increasing gradient of the motor-temperature $\theta_M$ becomes more gentle, and as a result, the motor-temperature $\theta_M$ is prevented from exceeding the upper limit temperature $\theta_{LIMIT}$.

Figure 8:
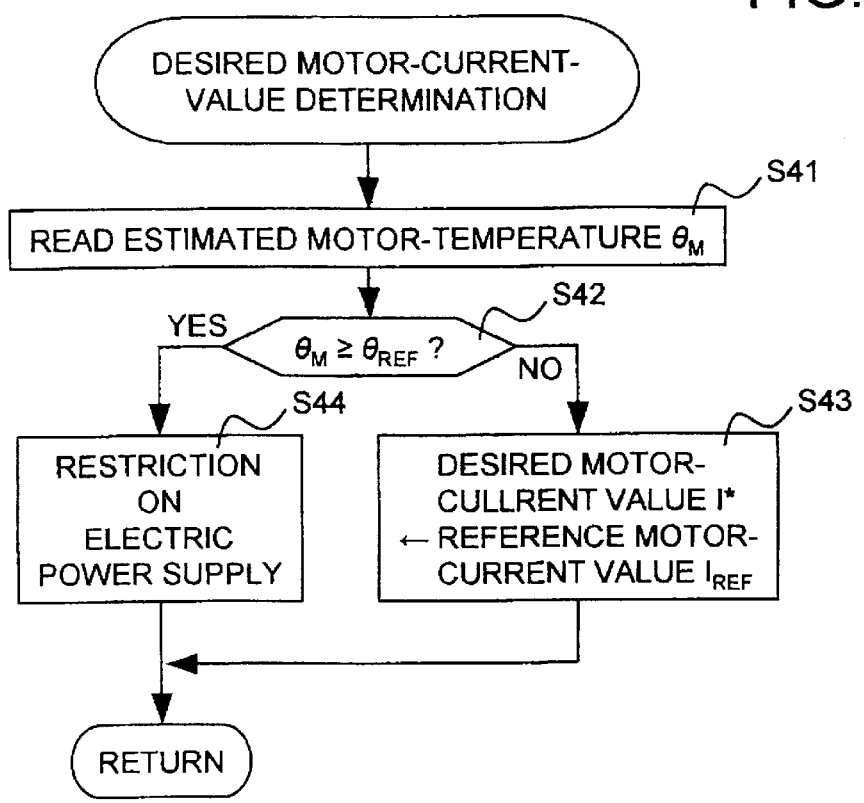
FIG. 8 is a flow chart illustrating a desired motor-current-value determination routine executed by the computer 100 of FIG. 4.

It will be understood from the foregoing description of the present embodiment that the motor coil 50 constitutes an example of a "heated portion" of the steering apparatus, a portion of the motor controller 96 assigned to execute the reference motor-current-value determination routine of FIG. 7, to implement step S43 of the desired motor-current-value determination routine of FIG. 8, and to execute the motor drive routine of FIG. 9 cooperates with the torque detecting device 80 and the motor-current-value sensor 110 to constitute an example of a "controlling device" of the steering apparatus, and a portion of the motor controller 96 assigned to execute the motor-temperature estimation routine of FIG. 5 and steps S41, S42, and S44 of the desired motor-current-value determination routine of FIG. 8 constitutes an example of a "power supply restricting device" of the steering apparatus. Moreover, a portion of the motor controller 96 assigned to execute the motor-temperature estimation routine of FIG. 5 constitutes an example of a "temperature estimating means" of the steering apparatus, and a portion of the motor controller 96 assigned to implement steps S42 and S44 of FIG. 8 constitutes an example of a "power supply restricting means" of the steering apparatus. Furthermore, the coil 90 for detecting the steering torque and the temperature detecting circuit 98 cooperate with each other to constitute an example of a "temperature sensor" of the steering apparatus, and a portion of the motor controller 96 assigned to implement steps S3 and S4 of FIG. 5 constitutes an example of an "initial temperature determining means" of the steering apparatus.

There will next be described an electrically operated power steering apparatus for an automotive vehicle, constructed according to a second embodiment of this invention. However, since the second embodiment is similar to the first embodiment in many elements except only ones associated with a motor-temperature estimation routine and a desired motor-current-value determination routine, only these different elements will be described in detail, while those similar elements will be identified by the same reference signs as used in relation to the first embodiment, for omission of detailed and redundant description on those similar elements in description of the second embodiment.

In the present embodiment, an initiation of one continuous holding operation during which the steering torque is rarely changed, which operation is a part of one continuous steering operation, is defined as a "reference point of time" of the steering apparatus. There exists a fact that it is reasonably possible to assume that an actual motor-current-value $I_{act}$ is placed in a stable condition thereof at an initiation of the holding operation. There also exists a fact that it is reasonably possible to estimate that a plurality of actual motor-current-values $I_{act}$ obtained from an initiation to a termination of one continuous holding operation are substantially equal to the actual motor-current-value $I_{act}$ obtained at the initiation of the same holding operation. In light of these two facts, the steering apparatus according to the present embodiment determines an allowable supply time period as a time period which is estimated to pass while the motor-temperature $\theta_M$ is raised from the initial motor-temperature $\theta_{M0}$ to the reference temperature $\theta_{REF}$, on the basis of the actual motor-current-value $I_{act}$ obtained at the initiation of the holding operation. Further, after the determined allowable supply time period $T_0$ has passed, the steering apparatus according to the present embodiment is adapted to start restricting the electric power supply to the motor coil 50, thereby preventing the motor-temperature $\theta_M$ from exceeding the upper limit temperature $\theta_{LIMIT}$.

Thus, in the present embodiment, in addition to a assumption that the motor-temperature $\theta_M$ is a parameter defined as a function of time $\tau$, the determined allowable supply time period $T_0$ is employed in place of the reference temperature $\theta_{REF}$, and as a result, a motor-temperature estimation routine is not utilized like in the first embodiment.

Figure 11:
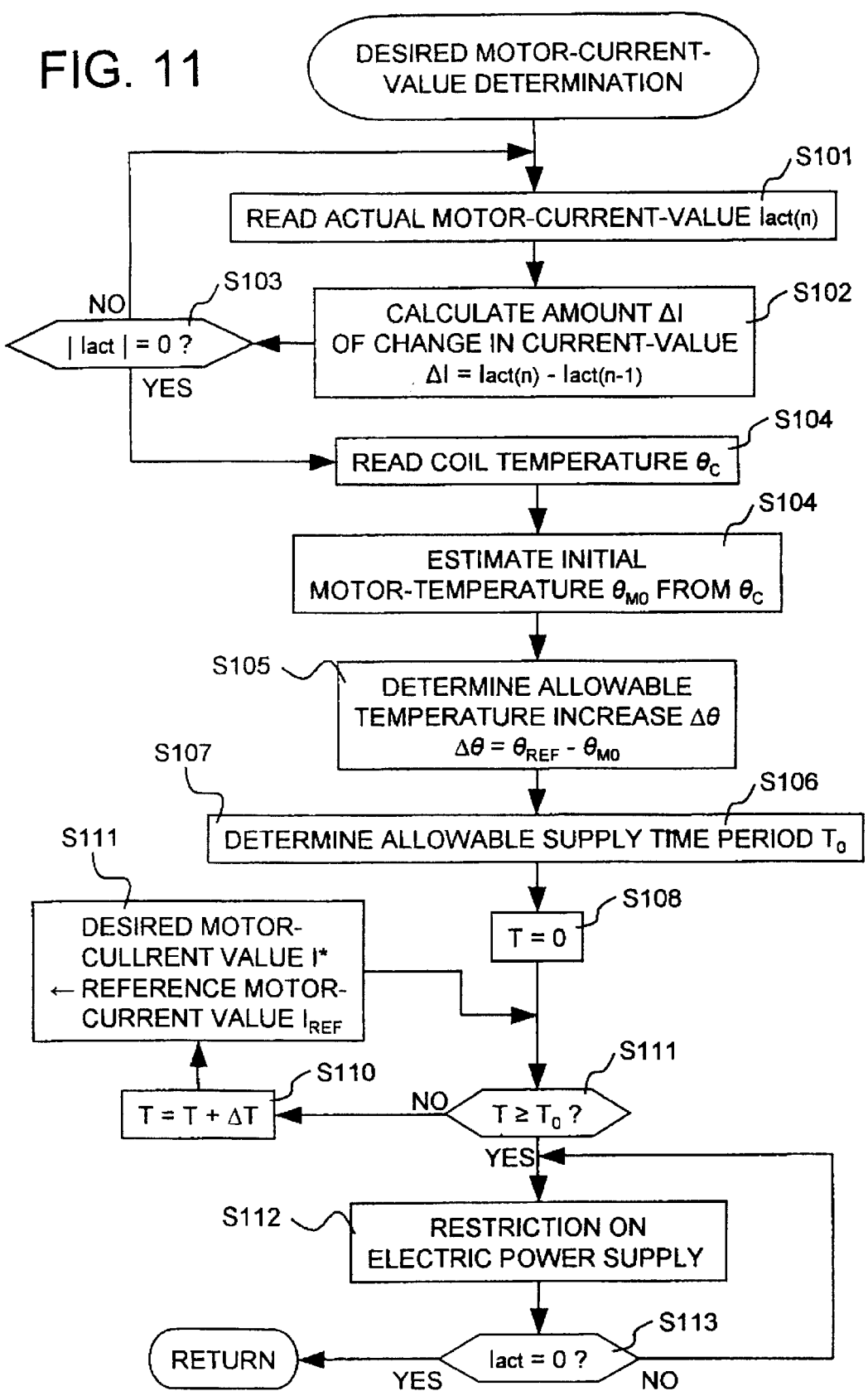
FIG. 11 is a flow chart representing a desired motor-current-value determination routine executed by a computer in an electrically operated power steering apparatus constructed according to a second embodiment of the present invention.

A desired motor-current-value determination routine used in the present embodiment is illustrated in the flow chart of FIG. 11. This routine is cyclically executed by the computer 100, like the other routines as already described. In each cycle of execution of this routine, step S101 is initially implemented to read a currently detected value $I_{act(n)}$ of the actual motor-current-value $I_{act}$ from the motor-current-value sensor 110. This routine then proceeds to step S102 to subtract a previously detected value $I_{act(n-1)}$ of the actual motor-current-value $I_{act}$ from the currently detected value $I_{act(n)}$ which has been previously read, thereby calculating an amount $\Delta I$ of change in the actual motor-current-value $I_{act}$. In step S103, a determination is then made as to whether a first condition which is met when the currently detected value $I_{act(n)}$ is not substantially zero and a second condition which is met when an absolute value of the calculated amount $\Delta I$ of change is substantially equal to zero are met at the same time. If these two conditions are not met concurrently, the determination is negative, and then this routine proceeds back to step S101. Afterwards, if these two conditions are met concurrently after repeated execution of a loop including steps S101–S103, the determination in step S103 is affirmative, and then this routine proceeds to step S104.

In step S104, the coil temperature $\theta_C$ is read from the temperature detecting circuit 98. This routine then proceeds to step S105 where the initial motor-temperature $\theta_{M0}$ is estimated on the basis of the previously read coil temperature $\theta_C$ in the same manner with the first embodiment. Then, in step S106, an allowable temperature-increase $\Delta\theta$ defined as an allowable increase of the motor-temperature $\theta_M$ from the initial motor-temperature $\theta_{M0}$, by subtracting the estimated initial motor-temperature $\theta_{M0}$ from the reference temperature $\theta_{REF}$.

Figure 12:
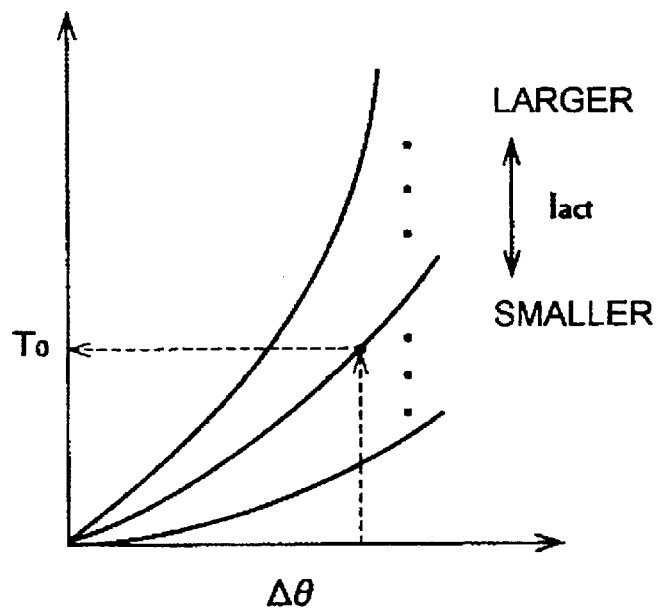
FIG. 12 is a graph illustrating a relationship among an allowable temperature increase Δθ, an actual motor-current-value $I_{act}$ at the initiation of a holding operation of a steering wheel by a vehicle operator, and an allowable supply time period $T_0$ utilized in the desired motor-current-value determination routine of FIG. 11.

In step S107, the allowable supply time period $T_0$ is then determined. In the present embodiment, the ROM has stored a relationship between the allowable supply time period $T_0$, the allowable temperature-increase $\Delta\theta$, and the actual motor-temperature $\theta_M$ at the initiation of one continuous holding operation by the vehicle operator, in the form of a table, a map, an expression, etc. According to the stored relationship, the allowable supply time period $T_0$ is determined from the determined allowable temperature-increase $\Delta\theta$ and the actual motor-temperature $\theta_M$ at the initiation of the holding operation. In the present embodiment, as shown in the graph of FIG. 12, the relationship is formulated such that the allowable supply time period $T_0$ is reduced as the allowable temperature-increase $\Delta\theta$ is raised, and is reduced as the actual motor-temperature $\theta_M$ at the initiation of the holding operation is raised.

In step S108, a passed time T period to be calculated from the initiation of the holding operation is initialized to be zeroed. This routine then proceeds to step S109 wherein a determination is made as to whether a present value of the passed time T is not shorter than the determined allowable supply time period $T_0$. If the present value of the passed time T is shorter than the determined allowable supply time period $T_0$, the determination is negative, and then, in step S110, the present value of the passed time T is updated by adding a predetermined cycle time period of this routine to the present value of the passed time T. Afterwards, in step S111, a present value of the reference motor-current-value $I_{REF}$ is read from the RAM, and then the reference motor-current-value $I_{REF}$ itself is used as a desired motor-current-value I*. The desired motor-current-value I* is stored in the RAM. This routine then returns to step S109.

If the present value of the passed time T becomes not shorter than the allowable supply time period $T_0$ during repeated execution of a loop including steps S109–S111, the determination in step S109 is affirmative, and then, in step S112, the restriction on the electric power to the motor 40 is effected. More specifically, a present value of the reference motor-current-value $I_{REF}$ is read out from the RAM, the reference motor-current-value $I_{REF}$ is multiplied by a predetermined correction factor k (here a fixed constant value) larger than "0" and smaller than "1." The result of multiplication is used as a new value of the desired motor-current-value I*. The desired motor-current-value I* is stored in the RAM.

In step S113, the actual motor-current-values $I_{act}$ is then read out from the motor-current-value sensor 110, and a determination is then made as to whether a condition that the actual motor-current-values $I_{act}$ is substantially equal to zero has been consecutively repeated a predetermined number of times. This step is implemented to determine whether the holding operation of the steering wheel 10 by the vehicle operator has been terminated or not. If the condition above-mentioned has not yet been consecutively repeated the predetermined number of times, the determination is negative, and then this routine proceeds back to step S112. To the contrary, if the condition above-identified has been consecutively repeated the predetermined number of times, the determination is affirmative, and then one cycle of execution of this routine is terminated.

Figure 13:
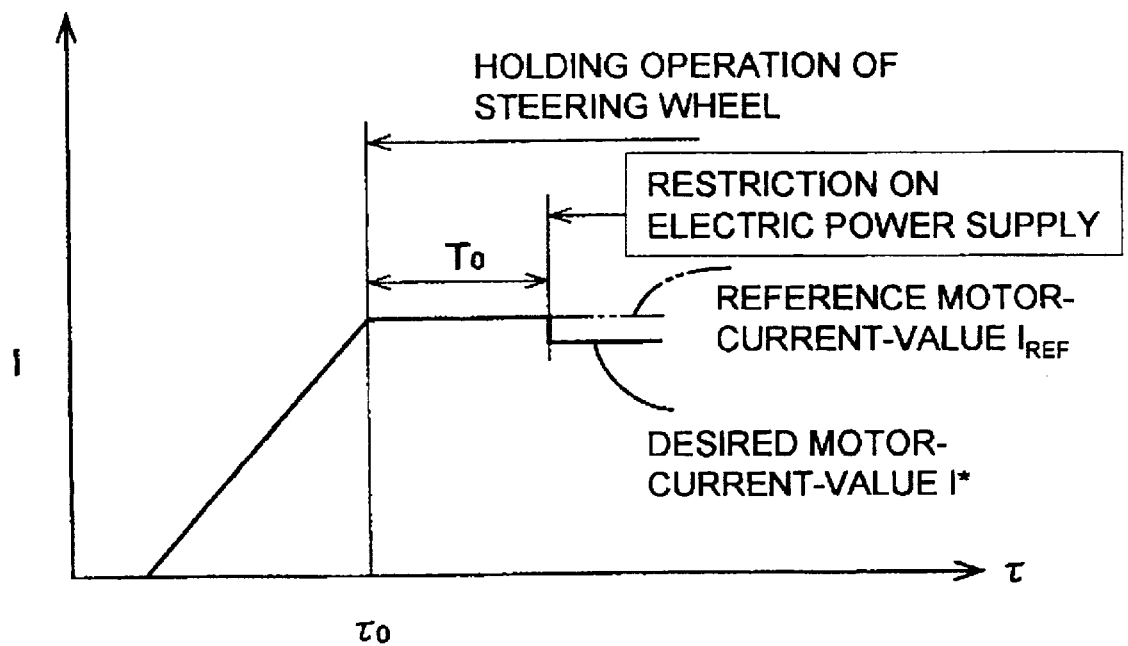
FIG. 13 is a graph for explaining changes with time τ in a motor-current-value I by execution of the desired motor-current-value determination routine of FIG. 11.

Changes with time τ in a relationship between the reference motor-current-value $I_{REF}$ and the desired motor-current-value $I^*$ is illustrated in the graph of FIG. 13. Upon initiation of a holding operation of the steering wheel 10, the allowable supply time period $T_0$ is determined on the basis of the actual motor-current-values $I_{act}$ and the allowable temperature-increase Δθ. If the allowable supply time period $T_0$ has passed since the initiation of the holding operation, the desired motor-current-value $I^*$ is reduced below the reference motor-current-value $I_{REF}$. The reduction means to restrict the electric power supply to the motor 40, thereby preventing the motor-temperature θ from exceeding the upper limit temperature $θ_{LIMIT}$.

It will be understood from the foregoing description of the present embodiment that the motor coil 50 constitutes an example of a "heated portion" of the steering apparatus, a portion of the motor controller 96 assigned to execute the reference motor-current-value determination routine of FIG. 7, to implement step S111 of the desired motor-current-value determination routine of FIG. 11, and to execute the motor drive routine of FIG. 9 cooperates with the torque detecting device 80 and the motor-current-value sensor 110 to constitute an example of a "controlling device" of the steering apparatus, and a portion of the motor controller 96 assigned to implement steps S101–S110, S112 and S113 of the desired motor-current-value determination routine of FIG. 11 constitutes an example of a "power supply restricting device" of the steering apparatus. Moreover, a portion of the motor controller 96 assigned to implement steps S101–S107 of FIG. 11 constitutes an example of an "allowable supply time period determining means" of the steering apparatus, and a portion of the motor controller 96 assigned to implement steps S108–S110, S112 and S113 of FIG. 11 constitutes an example of a "power supply restricting means" of the steering apparatus. Furthermore, the coil 90 for detecting the steering torque and the temperature detecting circuit 98 cooperate with each other to constitute an example of a "temperature sensor" of the steering apparatus, and a portion of the motor controller 96 assigned to implement steps S3 and S4 of FIG. 5 constitutes an example of an "initial temperature determining means" of the steering apparatus.

There will next be described an electrically operated power steering apparatus for an automotive vehicle, constructed according to a third embodiment of this invention. However, since the third embodiment is similar to the second embodiment in many elements except ones associated with a desired motor-current-value determination routine, only this routine will be described in detail, while those similar elements will be identified by the same reference signs as used in the second embodiment, for omission of detailed and redundant description on those similar elements in description of the third embodiment.

In the second embodiment, the allowable supply time period $T_0$ is determined only once at initiation of a continuous holding operation of the steering wheel 10 during the continuous holding operation. In the present embodiment, additionally, at a point of time when an amount of time-dependent change in the actual motor-current-values $I_{act}$ becomes not less than a predetermined reference value during the continuous holding operation, an actual increase $Δθ_{act}$ of the actual motor-temperature θ from that at the initiation of the continuous holding operation, on the basis of an integrated value of a plurality of actual motor-current-values $I_{act}$ obtained from the initiation of the continuous holding operation to the occurrence of the excessive amount of time-dependent change identified above. Furthermore, in the present embodiment, a second allowable supply time period $T_0$ is determined as a time period which is expected to pass since the occurrence of the excessive amount of time-dependent change until the actual motor-temperature $θ_M$ has reached the reference temperature $θ_{REF}$, on the basis of a sum of the estimated increase Δθ and the initial motor-temperature $θ_{M0}$, and the actual motor-current-values $I_{act}$ at the initiation of the continuous holding operation.

Figure 14:
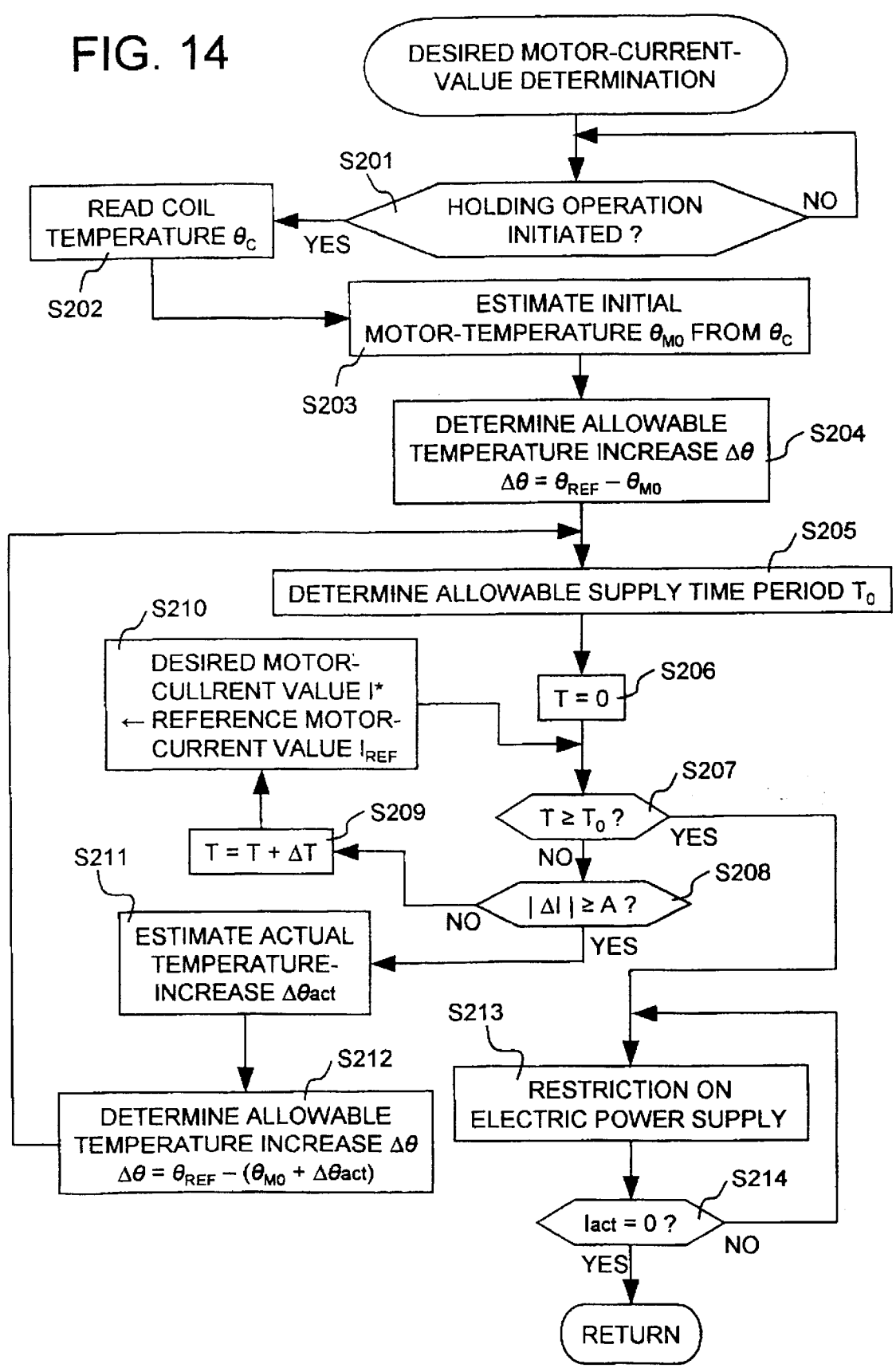
FIG. 14 is a flow chart representing a desired motor-current-value determination routine executed by a computer in an electrically operated power steering apparatus constructed according to a third embodiment of the present invention.

A desired motor-current-value determination routine used in the present embodiment is illustrated in the flow chart of FIG. 14. This routine is cyclically executed by the computer 100. Each cycle of execution of this routine is initiated with step S201 in which a determination is made as to whether a continuous holding operation of the steering wheel 10 has been initiated, in the same manner as steps S101–S103 in the second embodiment. If a continuous holding operation has been initiated, the determination is affirmative, and then the computer 100 implements steps S202–S205 in the same manner as steps S101–S107 in the second embodiment.

In step S206, the passed time T as already described in relation to the second embodiment is reset to zero similarly with step S108 in the second embodiment, and then this routine proceeds to step S207 where a determination is made as to whether a present value of the passed time T is not shorter than the allowable supply time period $T_0$ previously determined in step S205. If the present value of the passed time T is shorter than the determined allowable supply time period $T_0$, the determination is negative, and then this routine proceeds to step S208 where an amount ΔI of change of a currently detected value $I_{act(n)}$ from a previously detected value $I_{act(n-1)}$ of the actual motor-current-value $I_{act}$ is not less than a reference value A. If the amount ΔI of change is less than the reference value A, the determination is negative, and then the computer 100 implements steps S209 and S210 in the same manner as steps S110 and S112 in the second embodiment. This routine then proceeds back to step S207.

After repeated implementation of steps S207–S210, if the determination in step S208 is affirmative, and then this routine proceeds to step S211. In this step, an integrated value of a plurality of actual motor-current-values $I_{act}$ obtained from a time when the determination in step S210 has become affirmative (i.e., at the initiation of continuous holding operation) to a time when the determination in step S208 has become affirmative (i.e., at the occurrence of the excessive amount ΔI of change) is calculated. Further, in this step, the actual increase $Δθ_{act}$ of the actual motor-temperature θ at the occurrence of the excessive amount ΔI of change from that at the initiation of the continuous holding operation is calculated on the basis of the calculated integrated value. The estimation is performed in the same manner as in step S203.

In step S212, the actual motor-temperature $θ_M$ is then estimated as a sum of the initial motor-temperature $θ_{M0}$ and the estimated actual increase $Δθ_{act}$, and an allowable increase Δθ is determined by subtracting the estimated actual motor-temperature $Δ_M$ from the reference temperature $Δ_{REF}$. This routine then proceeds back to step S205 wherein an new allowable supply time period $T_0$ is determined on the basis of the determined allowable increase Δθ and a present value of the actual motor-temperature $θ_M$ (i.e., a sum of the estimated increase Δθ and the initial motor-temperature $θ_{M0}$) and according to a predetermined relationship between the allowable increase Δθ and the actual motor-temperature $θ_M$, represented by a graph similar to the graph of FIG. 12. This routine then proceeds to step S206 wherein the passed time T is reset to zero. Afterwards, the computer 100 implements steps including step S207 and the following ones, in the same manner as in the foregoing explanation.

Then, if a present value of the passed time T has become not less than the present value of the allowable supply time period $T_0$, the determination in step S207 is affirmative, and then the computer 100 implements steps S213 and S214 in the same manner as in steps S112 and S113. Then, one cycle of execution of this routine is terminated.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An electrically operated power steering apparatus for an automotive vehicle having a steering wheel to be operated by an operator of the vehicle and a steerable wheel thereof laying on a road surface, comprising:

a torque transmitting system transmitting a steering torque which is applied to the steering wheel by the operator, to the steerable wheel;

a motor applying a drive force thereof to the torque transmitting system so as to assist the steering torque;

a controlling device controlling an electric power supply to the motor, thereby permitting reduction in a required value of the steering torque with the assist of the drive force of the motor; and a power supply restricting device utilizing a temperature of a heated portion of the electrically operated power steering apparatus which emits heat as a result of the electric power supply to the motor, at a reference point of time, as an initial temperature of the heated portion, utilizing a plurality of electric power-related values each of which is related to at least one of a current and a voltage value of the motor, as a plurality of physical quantities related to temperature increases of the heated portion each of which is an increase of the temperature of the heated portion from that at the reference point of time, and restricting the electric power supply to the motor such that an actual value of the temperature of the heated portion does not exceed a predetermined upper limit thereof.

2. The apparatus according to claim 1, wherein the power supply restricting device comprises:

a temperature estimating means for repeating obtaining one of the plurality of electric power-related values after the reference point of time, for obtaining a sum of the plurality of electric power-related values which have been already obtained, each time a new one of the plurality of electric power-related values has been obtained, the obtained sum being defined as an integrated value of the already obtained plurality of electric power-related values, for estimating the temperature increase of the heated portion on the basis of the obtained integrated value, and for estimating the temperature of the heated portion at each one of a plurality of discrete points of time after the reference point of time, on the basis of the initial temperature and the estimated temperature increase of the heated portion; and a power supply restricting means for restricting the electric power supply to the motor such that the actual value of the temperature of the heated portion does not exceed the predetermined upper limit, on the basis of the estimated temperature of the heated portion.

3. The apparatus according to claim 2, wherein the power supply restricting means comprises a restricting amount determining means for, when the estimated temperature of the heated portion has reached a reference temperature formulated to be lower than the predetermined upper limit, restricting the electric power supply to the motor, and for repeating determining a restricting amount by which the electric power supply to the motor is to be restricted, on the basis of the estimated temperature of the heated portion at a corresponding one of a plurality of discrete points of time.

4. The apparatus according to claim 1, wherein the power supply restricting device comprises:

an allowable supply time period determining means for utilizing an initiation point of time of a holding operation of the steering wheel during which the vehicle operator is holding the steering wheel substantially at one steering position thereof which is other than a neutral position thereof, and for determining a time period which is estimated to pass from the initiation point of time of the holding operation until the temperature of the heated portion has reached the reference temperature, on the basis of the initial temperature of the heated portion, a reference temperature of the heated portion at which the restriction on the electric power supply to the motor is to be initiated, and the electric power-related value obtained at the initiation point of time of the holding operation, the determined time period being defined as an allowable supply time period for the electric power supply to the motor; and a supply restricting means for starting restricting the electric power supply to the motor when the determined allowable time period has passed.

5. The apparatus according to claim 4, further comprising a second allowable time period determining means for, at a change point of time when a time-dependent change of the electric power-related value occurs, whose amount is not less than a predetermined reference value thereof, during the holding operation, estimating the temperature increase which is an increase of the temperature of the heated portion from that at the initiation point of time of the holding operation, on the basis of an integrated value of the plurality of electric power-related values obtained during a period from the initiation point of time of the holding operation to the change point of time, and for estimating a time period which is expected to pass from the change point of time until the temperature of the heated portion has reached the reference temperature, on the basis of a sum of the estimated temperature increase and the initial temperature of the heated portion, and the electric power-related value obtained at the change point of time, the estimated time period being defined as a second allowable supply time period for the electric power supply to the motor.

6. The apparatus according to claim 4, wherein the allowable time period determining means comprises:

a first means for determining an allowable increase of the temperature of the heated portion on the basis of a deference between the reference temperature and the initial temperature of the heated portion; and a second means for determining the allowable supply time period corresponding to both the electric power-related value obtained at the initiation point of time of the holding operation and the determined allowable increase of the heated portion, according to a predetermined relationship among the electric power-related value obtained at the initiation point of time of the holding operation, the allowable increase, and the allowable supply time period.

7. The apparatus according to claim 6, wherein the second means comprises a means for determining the allowable supply time period such that the allowable supply time period decreases as the allowable increase decreases, and decreases as the electric power-related value at the initiation point of time of the holding operation increases.

8. The apparatus according to claim 1, wherein the power supply restricting device comprises an initial temperature determining means for determining an ambient temperature of the heated portion at the reference point of time, as the initial temperature of the heated portion.

9. The apparatus according to claim 1, further comprising a torque detecting device detecting the steering torque, the torque detecting device including a temperature sensor detecting a temperature of the torque detecting device, the power supply restricting device comprising an initial temperature obtaining means for obtaining the initial temperature of the heated portion on the basis of the temperature detected by the temperature sensor.

10. The apparatus according to claim 9, wherein the temperature sensor is located near the heated portion in the electrically operated power steering apparatus.

11. The apparatus according to claim 9, wherein the temperature sensor detects the temperature of the torque detecting device as a temperature to be changed according to a substantially constant correlation thereof with an ambient temperature of the heated portion.

12. The apparatus according to claim 9, wherein the controlling device comprises a means for controlling the electric power supply to the motor on the basis of the steering torque detected by the torque detecting device.

13. The apparatus according to claim 1, wherein the power supply restricting device comprises:

a first allowable supply time period determining means for using an initiation point of time of one continuous steering operation of the steering wheel by the vehicle operator, and for determining a time period which is expected to pass from the initiation point of one continuous steering operation until the temperature of the heated portion has reached a reference temperature at which the restriction on the electric power supply to the motor is to be initiated, on the basis of the initial temperature of the heated portion, a reference temperature formulated to be lower than the predetermined upper limit, and the electric power-related value obtained at the initiation point of time of one continuous steering operation, the determined time period being defined as a first allowable supply time period for the electric power supply to the motor; and a second allowable supply time period determining means for, at each one of a plurality of discrete points of time after the initiation point of time of one continuous steering operation, estimating the temperature increase which is an increase of the temperature of the heated portion from that at the initiation point of time of one continuous steering operation, on the basis of an integrated value of at least one of the plurality of electrical power-related values which has been obtained since the initiation point of time of one continuous steering operation, and for determining a time period which is expected to pass from each one of the plurality of discrete points of time until the temperature of the heated portion has reached the reference temperature, on the basis of a sum of the estimated temperature increase and the initial temperature of the heated portion, and the electric power-related value obtained at a corresponding one of the plurality of discrete points of time, the determined time period being defined as a second allowable supply time period for the electric power supply to the motor; and a supply restricting means for starting restricting the power supply to the motor when the first or second allowable supply time period determined by the first or second allowable supply time period determining means has passed.

14. An electrically operated power steering apparatus for an automotive vehicle having a steering wheel to be operated by an operator of the vehicle and a steerable wheel thereof laying on a road surface, comprising:

a motor applying a drive force thereof to a torque transmitting system transmitting a steering torque which is applied to the steering wheel by the operator, to the steerable wheel, so as to assist the steering torque;

a controlling device controlling an electric power supply to the motor, thereby permitting reduction in a required value of the steering torque with the assist of the drive force of the motor; and a power supply restricting device utilizing a temperature of a heated portion of the electrically operated power steering apparatus which emits heat as a result of the electric power supply to the motor, at a reference point of time, as an initial temperature of the heated portion, utilizing a plurality of electric power-related values each of which is related to at least one of a current and a voltage value of the motor, as a plurality of physical quantities related to temperature increases of the heated portion each of which is an increase of the temperature of the heated portion from that at the reference point of time, and restricting the electric power supply to the motor such that an actual value of the temperature of the heated portion does not exceed a predetermined upper limit thereof.

15. An electrically operated power steering apparatus for an automotive vehicle having a steering wheel to be operated by an operator of the vehicle and a steerable wheel thereof laying on a road surface, comprising:

a motor applying a drive force thereof to a torque transmitting system transmitting a steering torque which is applied to the steering wheel by the operator, to the steerable wheel, so as to assist the steering torque;

a controlling device controlling an electric power supply to the motor, thereby permitting reduction in a required value of the steering torque with the assist of the drive force of the motor; and a temperature estimating device utilizing a temperature of a heated portion of the electrically operated power steering apparatus which emits heat as a result of the electric power supply to the motor, at a reference point of time, as an initial temperature of the heated portion, utilizing a plurality of electric power-related values each of which is related to at least one of a current and a voltage value of the motor, as a plurality of physical quantities related to temperature increases of the heated portion each of which is an increase of the temperature of the heated portion from that at the reference point of time, and estimating the temperature of the heated portion using the initial temperature and the plurality of electric power-related values.

16. The apparatus according to claim 15, wherein the temperature estimating device comprises a temperature estimating means for repeating obtaining one of the plurality of electric power-related values after the reference point of time, for obtaining a sum of the plurality of electric power-related values which have been already obtained, each time a new one of the plurality of electric power-related values has been obtained, the obtained sum being defined as an integrated value of the already obtained plurality of electric power-related values, for estimating the temperature increase of the heated portion on the basis of the obtained integrated value, and for estimating the temperature of the heated portion at each one of a plurality of discrete points of time after the reference point of time, on the basis of the initial temperature and the estimated temperature increase of the heated portion.

* * * * *